Dec. 15, 1964  A. T. C. BURROWS  3,161,303
PARKING OR STORAGE OF VEHICLES
Filed Aug. 1, 1962  6 Sheets-Sheet 4

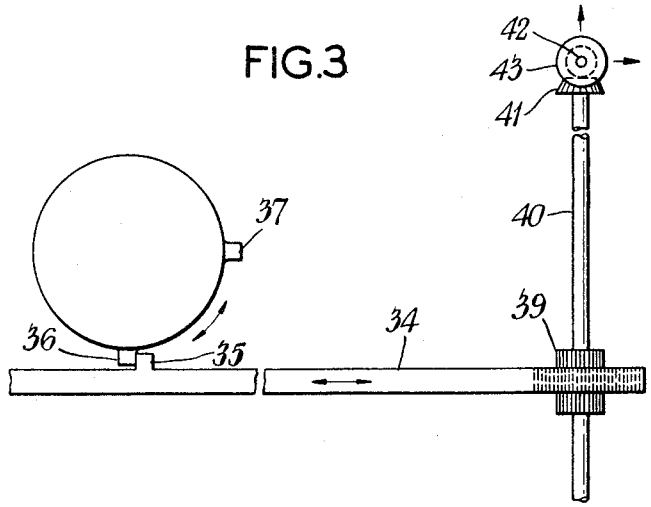
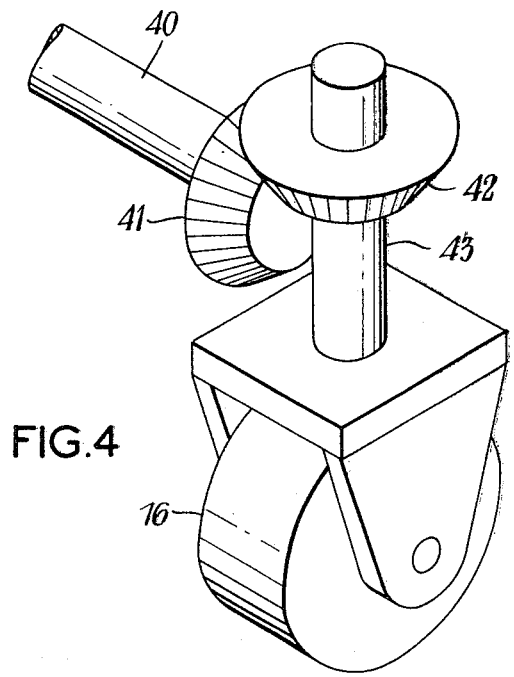

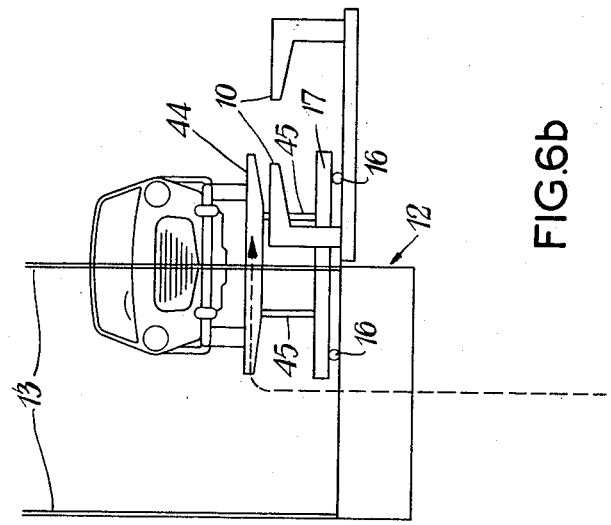
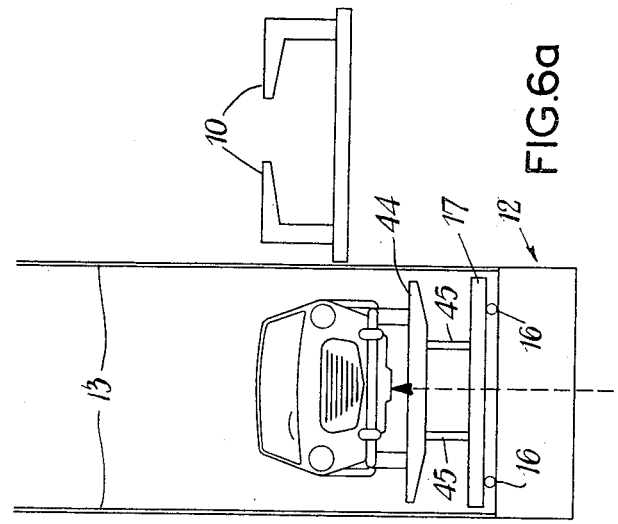

Dec. 15, 1964   A. T. C. BURROWS   3,161,303
PARKING OR STORAGE OF VEHICLES
Filed Aug. 1, 1962   6 Sheets-Sheet 6

3,161,303
PARKING OR STORAGE OF VEHICLES
Arthur Thomas Charles Burrows, Stevenage, England, assignor to Geo. W. King Limited, Stevenage, England, a British company
Filed Aug. 1, 1962, Ser. No. 214,138
Claims priority, application Great Britain, Aug. 1, 1961, 27,855; Nov. 28, 1961, 42,484
4 Claims. (Cl. 214—16.1)

This invention is concerned with the parking or storage of vehicles.

According to the invention there is provided a vehicle park or storage station comprising a multi-storey structure and a plurality of lifts so arranged in said structure that each is adapted to serve a plurality of parking or storage spaces on each floor or stage of the structure, there being means associated with each lift adapted on arrival of the latter at any selected floor or stage to be actuated to transfer a vehicle from such lift to any of the spaces served by the later and vice versa. Preferably each parking or storage space will incorporate a fixed grid like structure or a plurality of fixed grid like elements relatively so arranged as to provide a stable support for a vehicle while each lift will have associated therewith a grid or grill like table or platform adapted to support a vehicle and capable of being projected and retracted into and from any of the spaces served by the lift, there being means whereby said table or platform when projected may be moved upwardly and downwardly relatively to the fixed grid like structure or elements thereby to allow transfer of a vehicle from the latter to the table or platform and vice versa.

Figure 1:
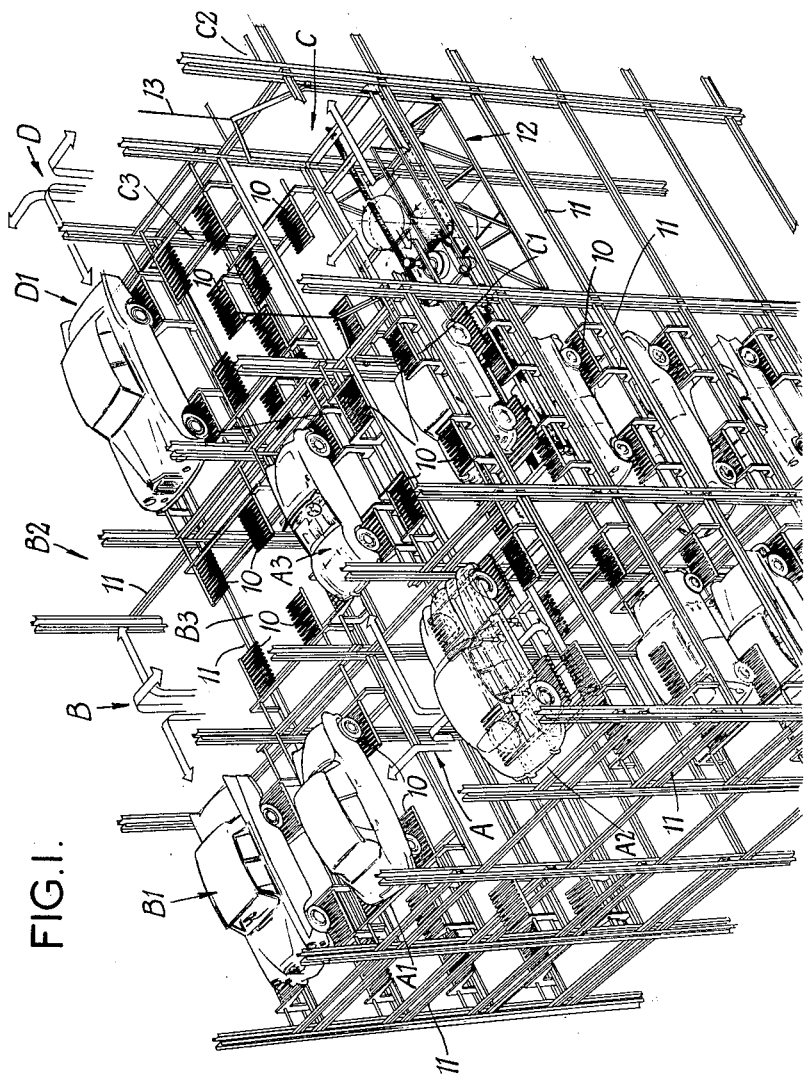
Figure 2:
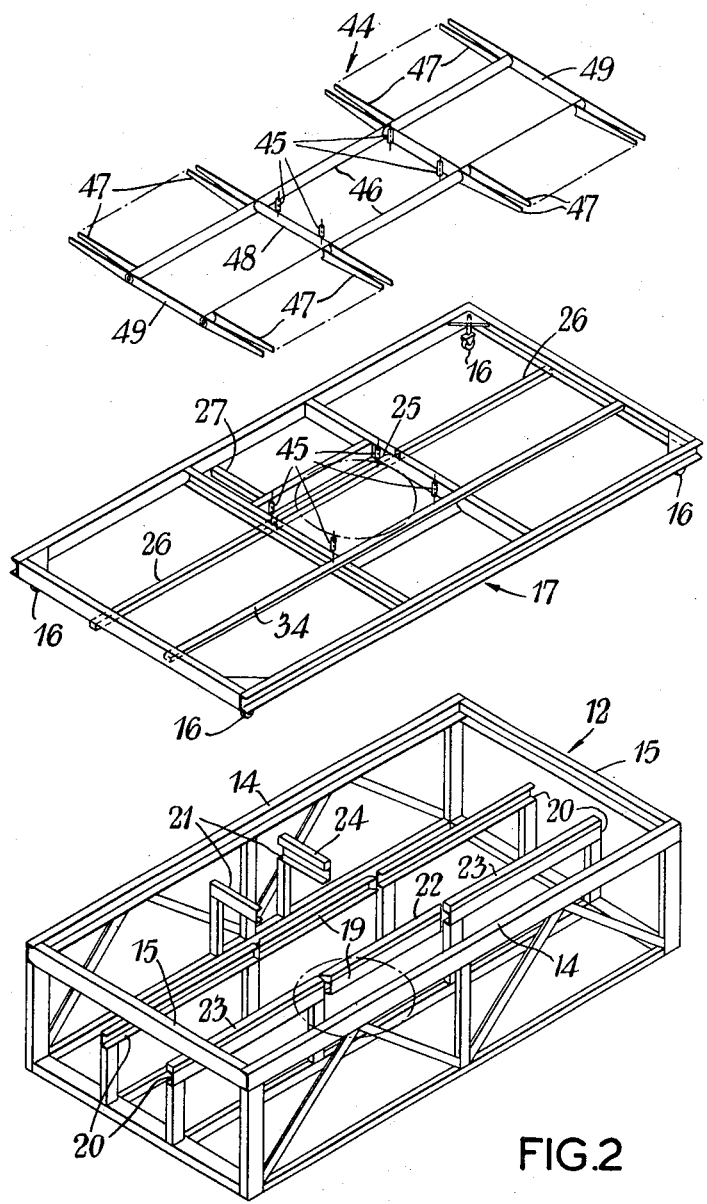
Figure 5:
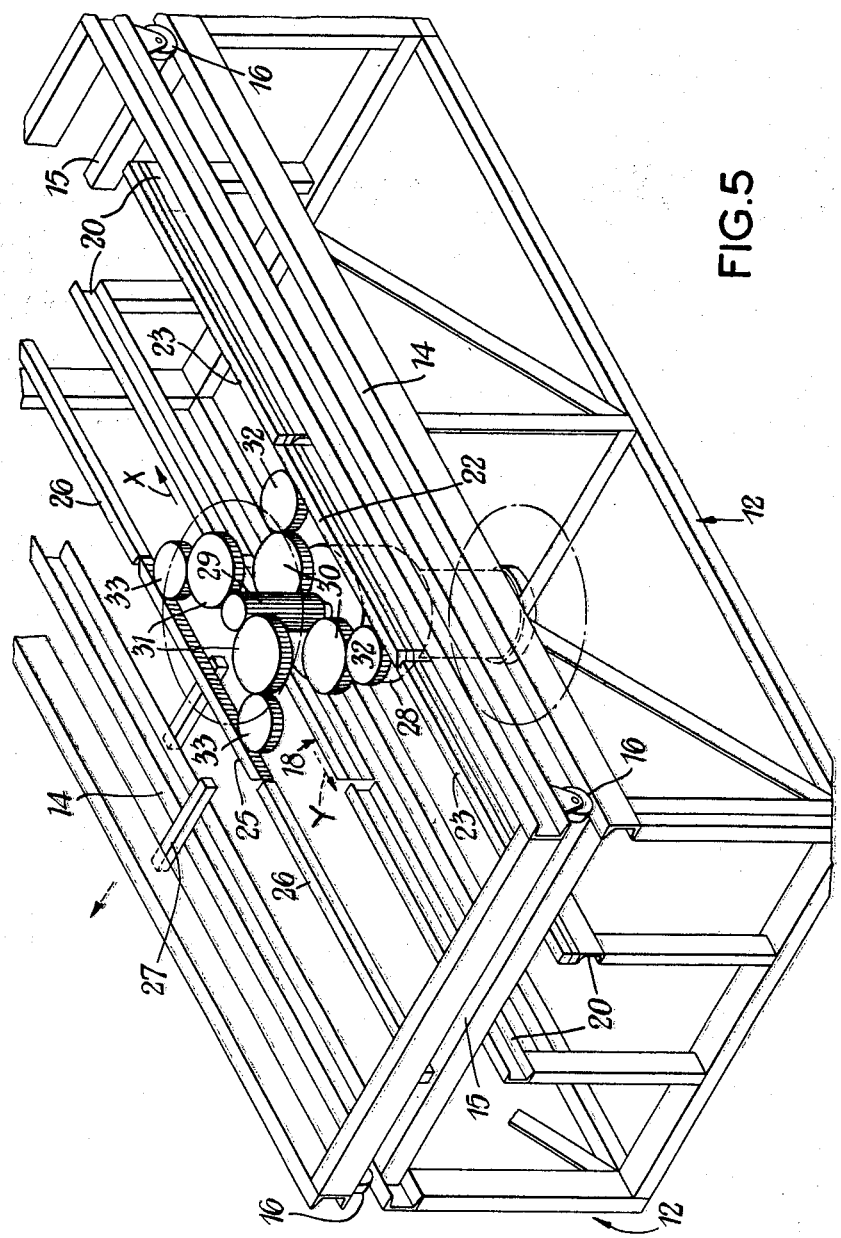

In order that the said invention may be clearly understood and readily carried into effect the same will be hereinafter more fully described with reference to the accompanying drawings in which:

FIGURE 1 is a perspective view of a parking or storage structure,

FIGURE 2 is an exploded view illustrating diagrammatically a lift platform assembly, FIGURES 3 and 4 illustrate details of construction for turning the castor wheels of the trolley, FIG 5 is a diagrammatic perspective view of a part of the lift platform assembly illustrated in FIGURE 3 and illustrates the nature of the operating mechanism incorporated therein, FIGURES 6a–d are diagrammatic views illustrating the sequence of operations.

Referring now to the drawings it will be seen that the parking or storage structure illustrated in FIGURE 1 incorporates a plurality of floors or stages each of which is adapted to provide a plurality of parking or storage spaces for vehicles. Incorporated in the structure is a plurality of lifts the positions of which are indicated at A, B, C and D in FIGURE 1, the arrangement being such that each lift will serve three parking or storage spaces on each floor or stage. When viewed in plan each floor or stage will incorporate a plurality of what may be termed units, each unit consisting of three parking or storage spaces and a lift well or shaft which are disposed in a T formation, the lift well being disposed at the centre of the cross member of the T and flanked at each of two opposed ends or sides by a parking or storage space while the third parking or storage space corresponding to the vertical member or leg of the T will be disposed adjacent one side or end of said well or shaft. In FIGURE 1 the spaces A1, A2, A3 are served by the lift A; the spaces B1, B2, B3 by lift B; C1, C2, C3 by lift C and so on. By providing such T shaped layouts it will be possible by appropriate arrangement thereof to utilise the area of each floor or stage to the best advantage.

Each parking or storage space will incorporate a stationary grid structure comprising four grid elements 10 relatively so arranged that they will provide a stable support for any vehicle likely to be stored. As will be seen from FIGURE 1 the grid elements 10 are supported in an elevated position with respect to the respectively floor joists 11 so that there is a clear space therebeneath the purposes of which will be hereinafter made apparent.

Each lift will comprise a vertically movable base frame designated generally by 12 which is of rectangular shape in plan and is adapted to be raised and lowered through the medium of ropes or cables 12, the latter being operatively connected to winding or hoisting mechanism of any appropriate type (not shown) mounted at the upper part of the main parking or storage structure. The base frame 12 will of course be fitted with appropriate guide means adapted to cooperate with appropriatedly fixed guides in the lift shaft or well in order to ensure smooth passage thereof up and down said shaft or well. At its upper part the frame 12 is provided with a pair of rail members 14 extending in spaced parallel relation along the length thereof. A further pair of transverse rail members 15 is also provided with said members 14 and 15 serving to provide running surfaces for castor wheels 16 carried by a mobile carriage or trolley 17. Also incorporated in the base frame 12 and centrally thereof is a turntable designated generally by 18 such turntable incorporating two channelled track members 19 disposed in spaced parallel relation. By virtue of the turntable the rail members 19 may be brought into alignment either with two sets of fixed rail members 20 which extend longitudinally of the base frame 12 or with a single set of rail members 21 extending transversely of said frame. It will be seen from FIGURES 2 and 5 that when the rail members 19 are aligned with the members 20 there will be two parallel guide channels extending lengthwise of the base frame 12 while when said rail members 19 are aligned with the members 21 there will be a pair of parallel guide channels extending from substantially the middle of the base frame 12 to the middle of one longitudinal edge thereof. Associated with one of the rail members 19 is a toothed rack 22 which is adapted on movement of the turntable to be aligned either with toothed racks 23 associated with appropriate rail members 20 or with a toothed rack 24 associated with the appropriate rail member 21.

The trolley 17 also incorporates centrally thereof a turntable which carries a toothed rack 25 which dependent upon the position of the turntable is adapted to be brought into alignment either with two similar rack sections 26 extending lengthwise of the trolley or with a single transversely extending rack 27, the racks 26 and 27 being fixedly mounted at the underside of said trolley.

Interposed between the underside of the trolley 17 and the base frame 12 is a power unit incorporating a reversible motor 28 (FIGURE 5) which is fitted with guide and supporting rollers (not shown) adapted to run in the tracks 19 and 20 or 19 and 21 in said frame 12 depending upon the position of the turntable 18. The output shaft of the motor 28 carries a gear 29 adapted to mesh with two pairs of gear wheels 30, 31 disposed at different levels. The gear wheels 30 are arranged to mesh with gear wheels 32 which are in turn so disposed as to mesh with the racks 22 and 23 or with the racks 22 and 24 carried by the base frame 12 depending upon the position of the turntable 18 in said frame. The gear wheels 31 at the upper level are arranged to mesh with gear wheels 33 in turn so disposed as to mesh with the racks 25 and 26 or with the racks 25 and 27 on the trolley depending upon the position of the turntable on said trolley. In FIGURE 5 the gear trains are shown diagrammatically and without any apparent means of support but it will be appreciated that they may be appropriately supported in relation to the motor in numerous ways thereby to form with the latter a unit.

With the turntables on the frame structure 12 and the trolley 17 in the position shown in FIGURE 5 it will be appreciated that operation of the motor 20 in one direction or the other will cause the trolley 17 to be moved either in the direction of the full line arrow X or the dotted line arrow Y. The motor unit 28 will traverse or move along the frame 12 as the trolley is also moved relatively to the latter into and from a position wherein it will be projected from said structure. Suitable stops will be incorporated on the tracks 20 to limit the extent of travel of the motor unit in either direction but said unit will however be effective on being brought to a stop to impart a further projecting movement to the trolley so that in its fully projected position the major portion thereof will be clear of the frame 12. With the turntables on the frame 12 and the trolley 17 turned through 90° to bring the rail members 19 and 21, the racks 22 and 24 and the racks 25 and 27 into their aligned positions it will be possible on appropriate operation of the motor 28 to impart projective and retractive movements to the trolley 17 in a lateral direction in relation to said frame structure. Here again suitable stop means will be associated with the rail members 21 to limit the extent of outward movement of the motor unit.

As indicated above the wheels or rollers 16 associated with the trolley 17 are of the castor type and preferably means will be incorporated in order to ensure appropriate automatic setting of such wheels or rollers depending upon the intended direction of travel of the trolley 17. In the embodiment illustrated the trolley is provided with a rack 34 so supported as to be capable of limited longitudinal movement. As will be seen from FIGURE 3 the rack 34 is provided with a lateral projection 35 with which either of two abutments 36, 37 on the turntable on the trolley is adapted to cooperate. The arrangement is such that as the turntable is moved into one position the abutment 36 will contact the projection 35 and impart a longitudinal movement to the rack 34 while movement of the turntable into its second position will result in the abutment 37 contacting the projection 35 and imparting a reversible movement to said rack. The rack 34 is arranged to cooperate at each end with a pinion 39 carried by a transverse shaft 40. At each end the shaft 40 carries a bevel wheel 41 adapted to cooperate with a bevel wheel 42 on the upwardly projecting shaft or pin 43 of the castor wheel. It will be appreciated that the longitudinal movement of the rack 34 resultant upon setting of the turntable will result in an appropriate angular movement of the shafts 40 and hence in appropriate setting of the castor wheels to conform to the intended direction of travel of the trolley.

Supported on the trolley 17 by means of four or any other appropriate number of screw or hydraulically operated jacks is a table or platform 44 in the form of a grid like structure on which any vehicle to be parked or stored or to be withdrawn from parking or storage will be supported. In FIGURES 6a-6d the jacks are indicated diagrammatically at 45 and in FIGURE 2 the positions are indicated also at 45 four jacks being used in this case. The table or platform 44 will be movable with the trolley 17 i.e. it will participate in the projective and retractive movements of the trolley but it will by virtue of the presence of the jacks be also movable vertically relatively thereto. As will be seen the table or platform 44 comprises essentially two longitudinal tubular frame members 46 serving to support a plurality of outwardly directed arms 47 constituting the actual supporting grids. The members 46 are interconnected at points intermediate their ends by transverse members 48 which serve as anchorage or attachment members for the jacks and at their opposite ends said members are interconnected by transverse bracing members 49. The table or platform 44 is so constructed and dimensioned that upon appropriate movement of the trolley 17 it may be moved laterally or lengthwise relatively to selected grid elements 10 of the main parking or storage structure into a position wherein it is disposed vertically above such grid elements and wherein on lowering of the jacks the arms or grid elements 47 will pass through the corresponding spaces in said elements 10 to allow said table or platform to assume a position which is below the level of the stationary grid elements 10 and from which it may be withdrawn on appropriate retractive movement of the trolley.

Figure 6D:
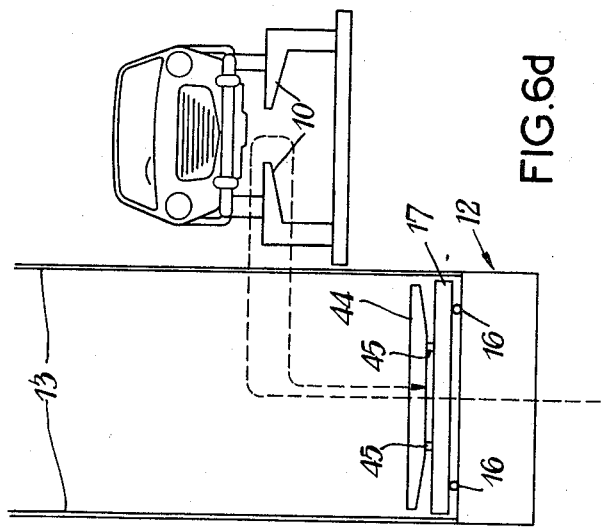
Figure 6C:
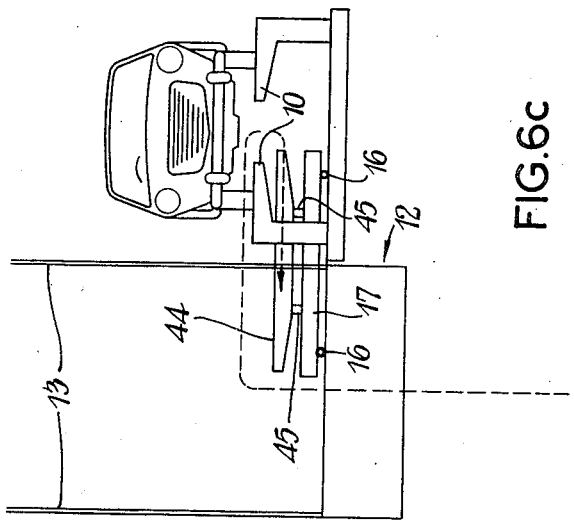

The apparatus described above is adapted to operate as follows:

With a lift at ground level a vehicle to be stored will be moved on to the table or platform 44 carried by the trolley 17 which latter is then of course in its central or mid position in relation to the frame 12. The lift will then be operated to raise the vehicle to the selected floor or stage at which point the trolley 17 with its load may, depending on space availability, be projected into a storage space at either end of the lift or into a space at the side of the latter e.g. in the case of the lift C of FIGURE 1, the trolley may be projected into the space C1, C2 or C3. At this stage the table or platform 44 will be in its uppermost position in relation to the trolley 17 so that it and the vehicle carried thereby will be above the level of the stationary grid elements 10 of the selected storage space. Assuming for example that the vehicle is to be stored in the space C3 then the turntable on the frame 12 of the lift and on the trolley 17 will if necessary be rotated to bring the rail members 19 and 21, the racks 22, 24 and the racks 25, 27 into alignment whereafter the motor 28 will be actuated to cause the trolley 17 to be projected laterally with respect to the frame 12. The sequence of operations is illustrated in FIGURES 6a-6d and referring now to those figures it will be seen that the trolley 17 is moved to bring the table or platform 44 with the vehicle supported thereon into a position vertically above the stationary grid elements 10. In this case the trolley 17 and table or platform 44 are moved laterally with respect to the stationary grid elements. With the vehicle appropriately positioned in relation to the stationary grid elements 10 the table or platform 44 is lowered by appropriate operation of the jacks so that the arms or grid elements 47 will be retracted through corresponding spaces in said elements 10 and the vehicle will be supported on the latter as shown in FIGURE 6C. With the table or platform 44 in its lowermost position the trolley 17 is then retracted as a result of appropriate operation of the motor 28 back to its initial position whereupon the lift may be lowered in readiness to receive a further vehicle. To remove the vehicle from its stored position the table or platform 44 will be set in its lowermost position on projection of the trolley 17 and when the latter is appropriately positioned in relation to the stationary grid elements 10 said table or platform will be projected upwardly so that the vehicle will be lifted from said grid elements 10 whereafter the trolley 17 may be retracted to its initial position on the frame 12 in readiness for lowering.

If the vehicle were to be stored in either of the spaces C1 or C2 the turntables on the frame 12 and the trolley 17 would be set so that the rail members 19, 20 the racks 22, 23 and the racks 25 and 26 would be aligned. With appropriate operation of the motor 28 the trolley 17 would then be projected into either space C1 or C2 but in either case it will be moved longitudinally or endwise with respect to the stationary grid elements 10 in those spaces.

It will be appreciated that in the main parking or storage structure rails or running surfaces will be incorporated to provide running surfaces for the appropriate wheels or rollers 16 of each trolley 19 when the latter is projected from the lift into any selected storage space in order to ensure that said trolley will be stably supported when so projected.

It will also be appreciated that it will be advisable to incorporate means to ensure that the lift assembly will be accurately aligned and maintained in accurate alignment with the selected floor or stage during any transfer operation. For example each frame 12 may be provided with a plurality of retractable rams or the like e.g. four rams may be provided one at or adjacent each corner of the frame 12 with their longitudinal axes horizontal or substantially so. At each floor level served by the lift fixed bearer members may be installed, the arrangement being such that the bearer members will be engaged by the rams or the like on extension of the latter. In the case where four rams are present four bearer members for example of substantially semi circular form will be appropriately located at each floor level.

The arrangement will be such that during lifting or lowering of the lift the rams will be retracted and on arrival of the lift at the selected floor or level it will be stopped with the rams an inch or so above the bearer members at that floor or level. At that point the rams will be projected either automatically or as a result of actuation of a control member so that when the lift is lowered slightly said rams will be in a position to engage the bearer members and will be effective positively to support the lift platform assembly. In this way precise alignment of the lift and the selected floor or stage will be obtained and the setting will not be changed to any measurable extent during such times as loading or off loading operations are carried out. When the lift is to be moved downwardly from a floor or stage after a loading or off loading operation it will be initially raised by a small amount so that the rams clear the bearers whereafter said rams may then be retracted and the lift lowered in the usual way. Instead of having projectable rams or the like on the frame 12 it may be feasible to locate a set of such items at each floor level in the structure defining the lift well or shaft so that they will be capable of being projected into the latter when required to cooperate with bearer members on said frame 12.

With a storage or parking structure of the kind outlined above it would be helpful if in the event of breakdown of one of the lifts or its ancillary equipment provision could be made whereby vehicles which would normally be transported only by that lift could be handled by means of one of the other lifts incorporated in the structure. To that end a plurality of light bridging grids or the like may be provided such grids being so designed that they will be capable of bridging any gaps present in the floor system so that a continuous floor or track may be provided over which vehicles may be moved from one storage space to another. Such bridging grids which could if necessary be transported by one of the lifts to any selected level may be of such a nature that they may be manipulated by hand or if desired mechanical means may be employed to facilitate movement thereof to their required positions.

Although in the construction hereinbefore described each lift is arranged to serve three parking or storage spaces it may so happen that in certain circumstances, due for example, to the nature of the site, it will be necessary to arrange for one or more lifts to serve four spaces i.e. for the trolley 17 to be capable of movement in any one of four directions according to requirements. In other words the arrangement will be such that the trolley may be projected as required from each side or from each end of the frame 12 according to which of the four spaces is to receive or to have a vehicle withdrawn therefrom. Such an arrangement would necessitate the addition of further rail members and a rack corresponding to the members 21 and the rack 24 on the frame 12 and the provision of an additional rack corresponding to the rack 27 on the trolley 17. Also of course the turntables would have to be capable of the additional angular movement or rotary movement.

With a construction such as has been described herein there will be no moving parts requiring maintenance on any floor or stage since each lift will carry or incorporate the only moving parts of the equipment. Thus any maintenance that is required can be effected without difficulty or risk at floor level or in an appropriate pit or the like at the bottom of each lift well or shaft.

I claim:

1. A vehicle storage station comprising a structure constituted by a plurality of stories, each story being identically subdivided into a plurality of substantially equal spaces, a plurality of lifts in said structure movable vertically through aligned open spaces in said stories, each open space through which said lift passes being associated with at least three adjacent spaces on each story of the structure to cooperatively associate all of the spaces in the structure with the lifts, and means associated with each lift to transfer a vehicle between said lift and the spaces associated with said lift; each lift comprising a base frame adapted for being raised and lowered in said structure through said open spaces, a trolley supported on said frame for relative movement in a substantially horizontal plane in longitudinal and transverse directions, means on said trolley for supporting a vehicle and means for imparting projective and retractive movements to the trolley in both directions relative to the frame to permit transfer of a vehicle in a fixed oriented position from the lift to the adjacent spaces associated therewith; said station further comprising power means in each lift movable relatively to the base frame and associated with the corresponding trolley for movement relatively thereto, said power means including a reversible motor and gear means, rack means associated with each said frame and rack means associated with the trolley for each said frame, said gear means being adapted for engaging both rack means to move the trolley relatively to said base frame upon operation of the motor.

2. A vehicle storage station comprising a structure constituted by a plurality of stories, each story being identically subdivided into a plurality of substantially equal spaces, a plurality of lifts in said structure movable vertically through aligned open spaces in said stories, each open space through which said lift passes being associated with at least three adjacent spaces on each story of the structure to cooperatively associate all of the spaces in the structure with the lifts, and means associated with each lift to transfer a vehicle beween said lift and the spaces associated with said lift; each lift comprising a base frame adapted for being raised and lowered in said structure through said open spaces, a trolley supported on said frame for relative movement in a substantially horizontal plane in longitudinal and transverse directions, means on said trolley for supporting a vehicle and means for imparting projective and retractive movements to the trolley in both directions relative to the frame to permit transfer of a vehicle in a fixed oriented position from the lift to the adjacent spaces associated therewith; the vehicle supporting means for each trolley comprising a grid-like platform supported on the trolley and capable of being raised and lowered with respect thereto.

3. A station as claimed in claim 2 comprising a plurality of jacks on each of the trolleys supporting the associated grid-like platform.

4. A vehicle storage station comprising a structure constituted by a plurality of stories, each story being identically subdivided into a plurality of substantially equal spaces, a plurality of lifts in said structure movable vertically through aligned open spaces in said station, each open space through which said lift passes being associated with at least three adjacent spaces on each story of the structure to cooperatively associate all of the spaces in the structure with the lifts, and means associated with each lift to transfer a vehicle between said lift and the spaces associated with said lift; each lift comprising a base frame adapted for being raised and lowered in said structure through said open spaces, a trolley supported on said frame for relative movement in a substantially horizontal plane in longitudinal and transverse directions, means on said trolley for supporting a vehicle and means for imparting projective and retractive movements to the trolley in both directions relative to the frame to permit transfer of a vehicle in a fixed oriented portion from the lift to the adjacent spaces associated therewith; said station further comprising only a plurality of fixed grid-like elements in each space adjacent the lift to provide a stable support for a vehicle.

References Cited by the Examiner

UNITED STATES PATENTS

| | | |
|---|---|---|
| 1,584,080 | 5/26 | Dinkelberg. |
| 1,584,517 | 5/26 | Dinkelberg. |
| 1,966,165 | 7/34 | Clyde. |
| 2,712,875 | 7/55 | Leopold. |
| 2,788,905 | 4/57 | Grove _____ 214—16.14 X |
| 2,838,186 | 6/58 | Alimanestiano. |
| 2,849,131 | 8/58. | Smith et al. |

FOREIGN PATENTS 1,107,720   8/55   France.

HUGO O. SCHULZ, *Primary Examiner.*

GERALD M. FORLENZA, *Examiner.*